PULSE COMMUNICATION SYSTEM

Filed Jan. 2, 1964

4 Sheets-Sheet 1

INVENTOR
F. E. WILLSON
BY
[signature]
ATTORNEY

July 11, 1967 F. E. WILLSON 3,330,909

PULSE COMMUNICATION SYSTEM

Filed Jan. 2, 1964

4 Sheets-Sheet 2

July 11, 1967 F. E. WILLSON 3,330,909

PULSE COMMUNICATION SYSTEM

Filed Jan. 2, 1964 4 Sheets-Sheet 3

United States Patent Office 3,330,909

Patented July 11, 1967

3,330,909
PULSE COMMUNICATION SYSTEM

Frank E. Willson, Whippany, N.J., assignor to Bell Telephone Laboratories, Incorporated, New York, N.Y., a corporation of New York Filed Jan. 2, 1964, Ser. No. 335,434
10 Claims. (Cl. 178—50)

ABSTRACT OF THE DISCLOSURE

Flip-flops respond to information encoded on a multi-level basis so that when any one of the code levels occurs more than once in succession, a pulse at a first frequency is transmitted for each even numbered occurrence in the sequence. For the remaining occurrences of code levels, the flip-flops cause pulses at frequencies uniquely related to the levels to be transmitted. At a receiver, delay lines store each output for one pulse period; the stored output is gated out when a pulse at the first frequency is received.

Figure 1:
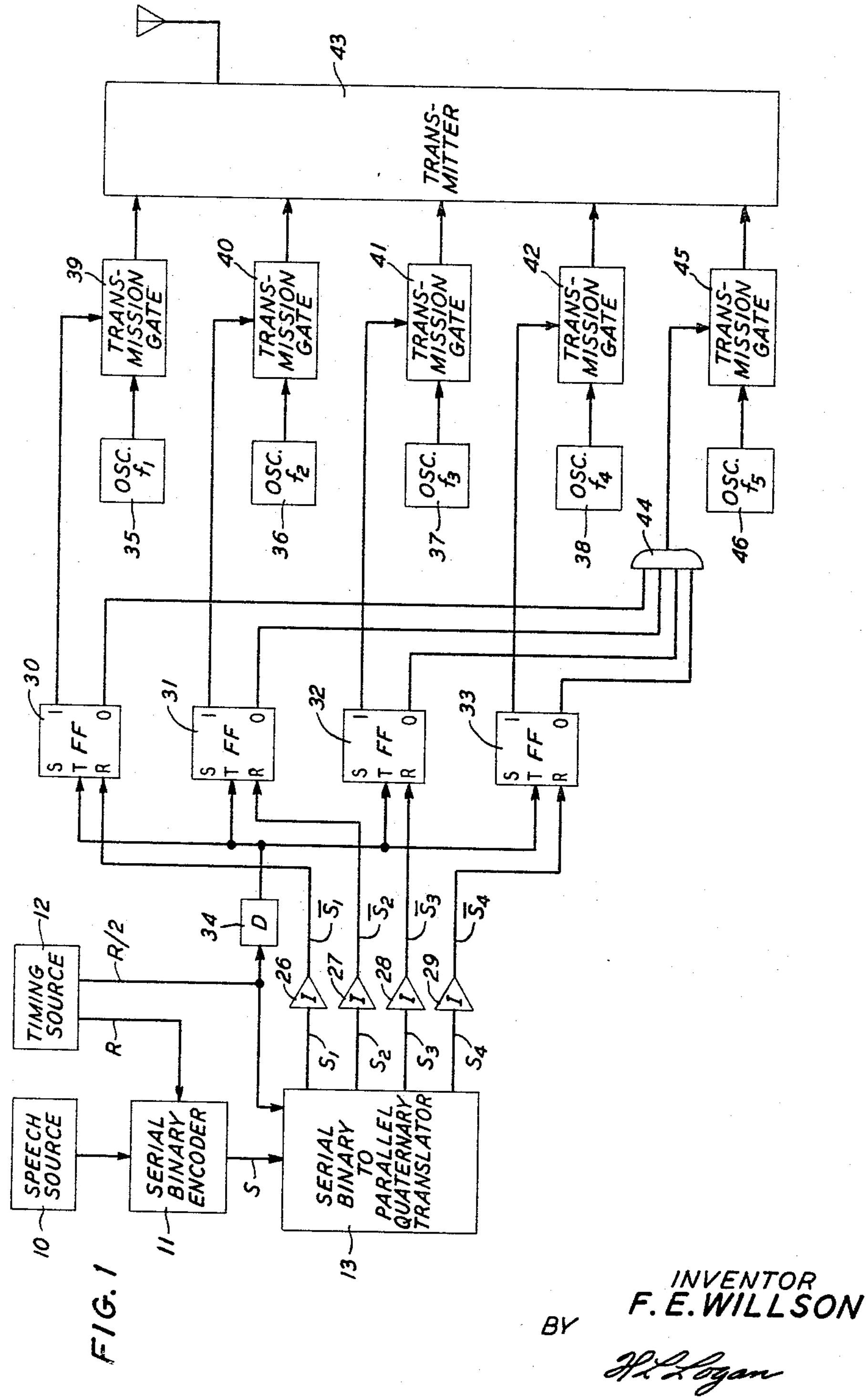

This invention relates to pulse communication systems and in particular to systems which transmit pulse type information by radio.

Some radio systems are known to be vulnerable to multipath propagation. For example, if the information transmitted is in the form of sequentially transmitted pulses, pulse stretching may occur. Pulse stretching frequently makes it impossible to detect individual pulses when successive pulses of the carrier wave are at the same frequency. A solution to this problem is to provide sufficient guard space between successive pulses. This, however, reduces the information rate.

A principal object of the present invention is to avoid the problems created by pulse stretching without reducing the information rate.

Another object of the invention is to facilitate the detection of successive pulses in radio systems susceptible to multipath propagation.

Still another object of the invention is to increase the information rate in a pulse type radio transmission system without inducing errors due to pulse stretching.

These and other objects are achieved in embodiments of the invention by assigning a unique frequency to each level of a code employed to encode information to be transmitted. In the illustrated embodiment described below, for example, frequencies $f_1$, $f_2$, $f_3$, and $f_4$ are assigned to respective levels of a quaternary (four level) code. In accordance with the invention, each element of the encoded information is normally transmitted by transmitting a pulse of carrier energy at the frequency assigned to the level of that element. When, however, any one of the code elements is immediately repeated after the frequency assigned to the level of that element has just been transmitted, a pulse of energy at a different frequency (that is a frequency other than those uniquely assigned to the code levels) is transmitted. In the illustrated embodiment, an $f_5$ is used to produce this repeat or ditto-like characteristic. Three successive occurrences of the code level to which the frequency $f_2$ is assigned would therefore be transmitted as pulses of energy at frequencies $f_2$, $f_5$ and $f_2$, respectively.

At a receiving terminal the received pulses of energy are detected to produce signals representative of the original frequencies. The signals corresponding to the frequencies normally assigned to the code levels are used to represent some of the elements of the encoded information. Each of the signals corresponding to the frequencies normally assigned to the code levels is also stored until the following signal has been produced. When the following signal corresponds to the frequency utilized to produce the repeat or ditto-like characteristic, the previously stored signal is gated out and used to represent an element of the encoded information, thus restoring the repeated element in the encoded information that was represented by the ditto frequency.

When practicing the invention it is necessary that each pulse of energy be transmitted only after it is reasonably certain that its leading edge will arrive at the receiving terminal after the trailing edge of the second preceding pulse has been received. If this condition is not met, then the problems created by pulse stretching will occur when code elements of the same level and separated by one code element occur. For the same information rate, a code having a greater number of distinct levels will prevent this problem. The disclosed embodiment, for example, uses a quaternary code. Other M-ary codes (where M represents the number of distinct levels in a code) may be used. It should be noted, however, that it is desirable to maintain M as small as possible in order, for one reason, to keep the required equipment to a minimum.

Several techniques may be employed to select an M-ary code where M is a minimum. A convenient way for selecting an M-ary code when the information to be transmitted is available in binary form is to use the following expressions:

$$P=\frac{d+t_p}{2}$$

and $$M=2^{PR}$$

where P equals the period of the transmitted pulses, $d$ equals the maximum anticipated pulse stretching time, $t_p$ equals the duration of the transmitted pulse, M equals the number of distinct levels in the code being selected and R equals the bit rate of the binary information to be placed in M-ary code form.

By way of example of the use of the above expressions, in the following illustrative embodiment the duration of the transmitted pulses equals their period and the maximum anticipated pulse stretching time approaches twice the period of the binary encoded information. Under these conditions, P equals $t_p$ and $d$ is approximately equal to $2/R$. When these values are used in the expressions to solve for M, M equals four thus indicating that a quaternary code should be used.

From the above discussion, it is believed to be readily apparent that the frequency in each pulse period cannot be utilized in the succeeding pulse period. In accordance with a feature of the invention, this method of code level representation is used to advantage by blocking the receiving terminal during each pulse period to the frequency of the previously received pulse. By blocking the receiving terminal in this manner, the use of energy at the frequency which provides the ditto-like characteristic does not deteriorate the signal-to-noise ratio of the receiving terminal.

Another feature of the invention takes advantage of the fact that each of the received pulses is at a frequency different from its immediate predecessor even though a code element is repeated. In accordance with this feature, the distinct changes in frequency are utilized to derive timing or synchronizing pulses at the receiving terminals.

The above-described use of a different frequency to avoid pulse stretching problems is achieved in the illustrative embodiment through the use of combinations of relatively simple logic circuits. As mentioned previously the embodiment uses a quaternary (four level) code with only one level of the code occurring at any one time. At the transmitting terminal a combination of logic circuits is responsive to the four code levels to gate the individual outputs of five oscillators to a transmitter. The outputs from four of the five oscillators are in general gated in response to the occurrences of the four code levels respectively. When, however, a sequence of any one of the code levels occurs, the output of the fifth oscillator is gated for the even-numbered occurrences of the level within the sequence in place of the output of the oscillator assigned to that code level. A sequence at the code level associated with the oscillator producing frequency $f_3$, for example, results in the frequencies $f_3, f_5, f_3, f_5, \ldots$ being gated to the transmitter.

At the receiving terminal of the embodiment a combination of four logic circuits is used to reconstruct the encoded information from the received pulses of energy. The logic circuits reproduce the four code levels, respectively, in response to received pulses of energy at the four frequencies assigned to the code levels at the transmitting terminal. Each time a logic circuit produces a code level output, the code level output is stored within the circuit until the next pulse has been received. When the next received pulse is at the frequency $f_5$, the stored code level output is gated out of the logic circuit thus completing the reproduction of the originally encoded information.

Other objects and features of the invention will become apparent from a study of the following detailed description of a specific embodiment of the invention.

Figure 2:
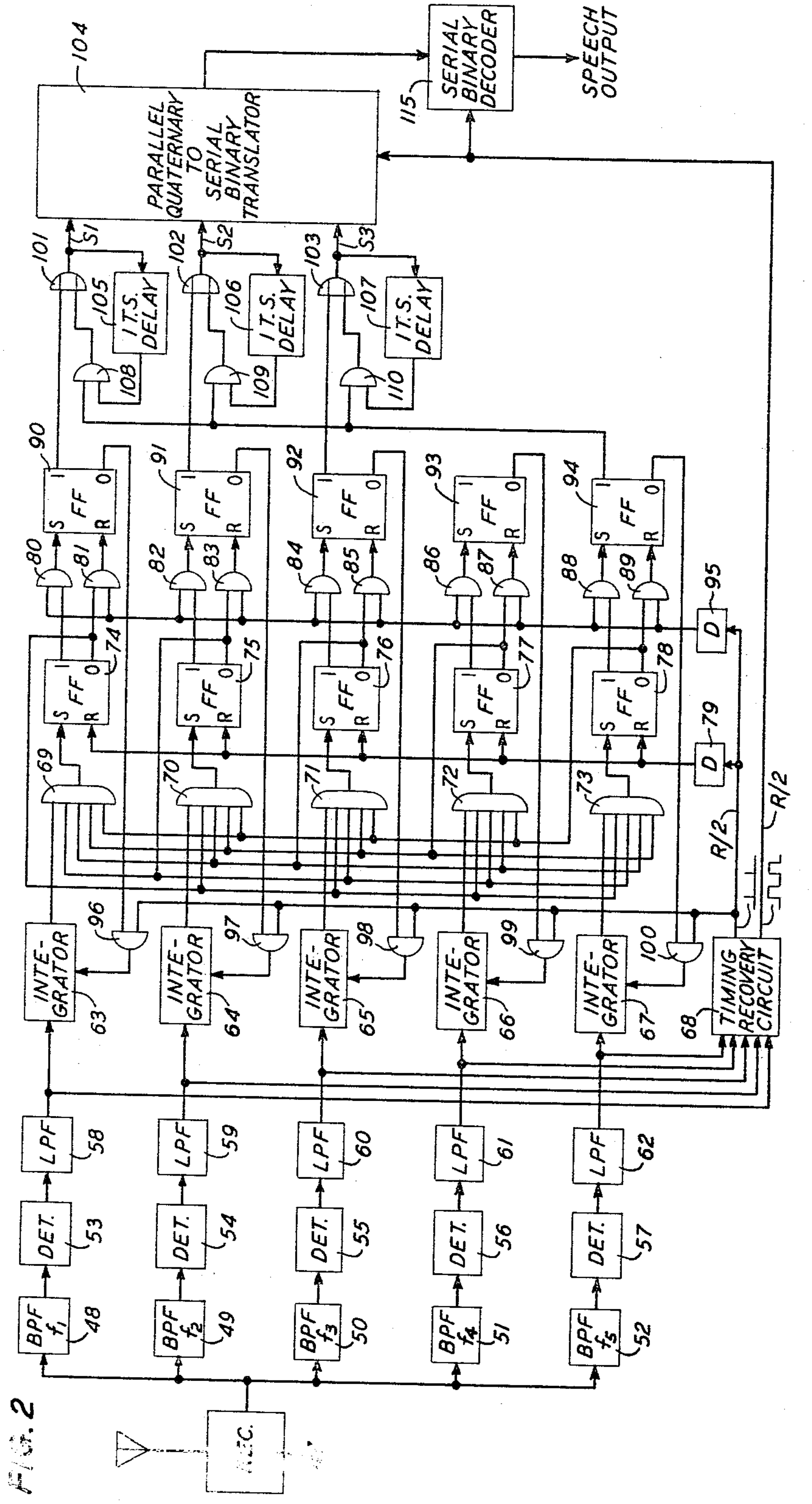
Figure 3:
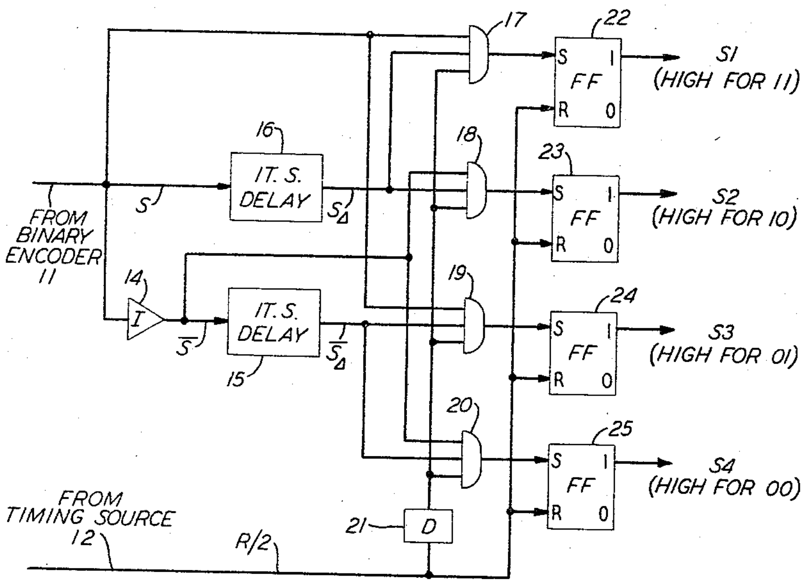
Figure 4:
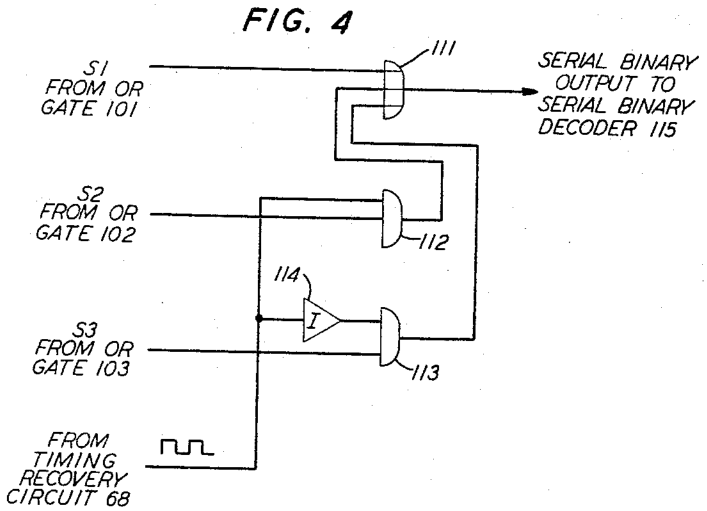

In the drawings:

FIGS. 1 and 2 disclose block diagrams of transmitting and receiving stations, respectively, of one embodiment of the invention;

FIG. 3 discloses in block diagram form a serial binary to parallel quaternary translator that may be used in the transmitting portion of the disclosed embodiment;

FIG. 4 discloses in block diagram form a parallel quaternary to serial binary translator that may be used in the receiving portion of the disclosed embodiment; and FIGS. 5A through 5F disclose waveforms appearing at various points within the receiver portion of the embodiment.

In the transmitting portion of the embodiment shown in FIG. 1, the output of a speech source 10 is applied to a serial binary encoder 11. Timing pulses at a repetition rate R from a timing source 12 are also applied to encoder 11. Encoder 11 samples and encodes the output of speech source 10 in a conventional manner. The output of encoder 11 is identified as S and has a bit rate equal to R. Furthermore, output S has a high or positive voltage value for a binary 1 and a low or zero voltage value for a binary zero.

As discussed previously, the disclosed embodiment is for use where the duration of the transmitted pulses equals the period of the transmitted pulses and the maximum anticipated pulse stretching time approaches twice the period of the binary encoded information appearing in the output of encoder 11. As demonstrated above, these conditions require that the binary encoded information be placed in a quaternary encoded form. A serial binary to parallel quaternary translator 13 is provided for this purpose.

Timing pulses at the rate of $R/2$ produced by timing source 12 are applied to quaternary translator 13 for timing purposes. Translator 13 has four parallel outputs identified as S1 through S4. The four distinct levels of the quaternary code are indicated by high or positive levels on the output leads. At any one time, therefore, only one output can be high while the remaining outputs are at low or zero voltage levels. The outputs are therefore in a one-out-of-four form.

A serial binary to parallel quaternary translator that may be used in the transmitter portion of the invention shown in FIG. 1 may take the form of the translator shown in FIG. 3. When using the translator of FIG. 3, the output S of binary encoder 11 is applied to an inverter 14. The output of inverter 14, which is identified as $\overline{S}$ and complements its input, is applied to a delay circuit 15. Delay circuit 15 provides a delay equal to the period of the binary encoder output; i.e., it provides a delay equal to one time slot of the binary encoder output S. The binary encoder output S is also applied to a delay circuit 16. Delay circuit 16 also provides a delay equal to one time slot of the binary encoder output S. The outputs of delay circuits 15 and 16 are identified as $\overline{S}_\Delta$ and $S_\Delta$, respectively.

The complementary inputs and complementary outputs of delay circuits 15 and 16 are applied to a group of AND gates 17 through 20. In particular, outputs S and $S_\Delta$ are applied to AND gate 17, outputs $\overline{S}$ and $S_\Delta$ are applied to AND gate 18, outputs S and $\overline{S}_\Delta$ are applied to AND gate 19, and outputs $\overline{S}$ and $\overline{S}_\Delta$ are applied to AND gate 20. Each AND gate therefore receives a delayed version of either the previous binary bit or its complement and the present binary bit or its complement. It is believed to be readily apparent that, during each binary time slot, one of the AND gates must have two high inputs while the remaining AND gates have at least one low input.

Timing pulses at the rate of $R/2$ are delayed in a delay circuit 21 by an amount equal to a relatively small fraction of a binary time slot and then applied to each of AND gates 17 through 20. Each time the timing pulses are applied to the AND gates, the AND gate which already has two high inputs is caused to produce a high output. (Delay circuit 21 is provided to permit subsequent circuitry, as will become apparent in the following paragraph, to stabilize before the AND gates are triggered.) Because the timing pulses occur at one-half the binary rate, a high output is produced by the AND gates only for every other bit in output S. Stated in another fashion, the logic arrangement triggered by the timing pulses produces a high output for each successive pair of bits in output S. When, for example, the second binary bit of a pair of binary ones occurs substantially simultaneously with one of the timing pulses, AND gate 17 produces a high output. Similarly, when triggered by the timing pulses, AND gates 18, 19, and 20 produce high outputs upon the successive occurrences of a binary one and zero, a binary zero and one, and a pair of binary zeros, respectively.

The outputs of AND gates 17 through 20 are applied to the SET inputs of a plurality of flip-flops 22 through 25, respectively. Timing pulses at the rate of $R/2$ are applied to the RESET inputs of flip-flops 22 through 25. Immediately after the occurrence of a timing pulse, flip-flops 22 through 25 are all in their reset conditions so that their ONE sides are in their low states. The same timing pulse is also delayed for a small fraction of one binary time slot in delay circuit 21 and then applied to AND gates 17 through 20. One of these AND gates, depending upon the previous and present digits in output S, produces a high output which causes the flip-flop associated with it to change state. The ONE side of the flip-flop that changes state produces a high output which continues until the occurrence of the next timing pulse, at which time the flip-flop is reset. Flip-flops 22 through 25 therefore perform waveforming functions as they produce substantially uniform output waves in response to their respective AND gates 17 through 20. Furthermore, only one-out-of-four of the outputs S1 through S4 can be high at any one time. The quaternary level is therefore indicated by the output S1 through output S4 which is in a high state.

Referring back to FIG. 1, outputs S1 through S4 of translator 13 are inverted in a plurality of inverters 26 through 29, respectively, to produce their complements $\overline{S1}$ through $\overline{S4}$. (When constructing the disclosed embodiment, these complements are, of course, immediately available from the ZERO sides of flip-flops 22 through 25.) Outputs $\overline{S1}$ through $\overline{S4}$ are applied to the RESET inputs of a plurality of flip-flops 30 through 33, respectively. Because the presence of a quaternary level is indicated by one and only one of outputs S1 through S4 being high, outputs $\overline{S1}$ through $\overline{S4}$ are therefore all high with the exception of the one which is a complement of the high output of translator 13. The flip-flops to which the high outputs of outputs $\overline{S1}$ through $\overline{S4}$ are applied are locked in their reset conditions. The flip-flop to which the low output of outputs $\overline{S1}$ through $\overline{S4}$ is applied may therefore be caused to change state by applying a triggering signal to its toggle input.

Triggering pulses comprising pulses at the rate *R/2* from source 12 delayed by a delay circuit 34 are applied to each of the toggle inputs of flip-flops 30 through 33. (Delay circuit 34 provides a slight delay to permit flip-flops 30 through 33 to settle in response to the outputs from translator 13 before applying the triggering pulses.) The flip-flop which has the low output applied to its RESET input is caused to change state by the triggering pulse, thus causing its ONE side to produce a high output. When a low output applied to the RESET input of a flip-flop continues for several trigger pulses, the flip-flop changes state with each trigger pulse so that its ONE side output alternately switches between its high and low states. The effect of this action is discussed in detail subsequently.

A plurality of oscillators 35 through 38 produce outputs at frequencies $f_1$ through $f_4$, respectively. These outputs are gated by a plurality of transmission gates 39 through 42 in response to the high state ONE side outputs of flip-flops 30 through 33, respectively, to a transmitter 43.

With one exception, frequencies $f_1$ through $f_4$ are gated to transmitter 43 in response to the occurrences of the high states of outputs S1 through S4, respectively. The exception occurs when any one of outputs S1 through S4 remains in a high state for a sequence of triggering pulses. Because of the alternating output produced by one of the flip-flops under these conditions (as discussed in the previous paragraph), the output of the oscillator assigned to the high state output of outputs S1 through S4 is applied to the transmitter only for the odd numbered occurrences of the triggering pulses in the sequence. During the even numbered triggering pulses in this sequence of triggering pulses, all of the ZERO sides of flip-flops 30 through 33 are in their high states and cause an AND gate 44 to produce a high output. This high output enables a transmission gate 45 which causes an output at frequency $f_5$ from an oscillator 46 to be applied to transmitter 43. Because frequency $f_5$ is used in place of the frequency just previously used, it performs a ditto-like function.

In order not to introduce transients in the operation of oscillators 35 through 38 and 46, transmission gates 39 through 42 and 45 should not switch between their disabled and their enabled states too rapidly. A rapid transition is prevented in a conventional manner by including a filter in each of the enabling inputs of gates 39 through 42 and 45.

The filter in the enabling input of gate 45 performs still another function. In particular, a relatively short duration high output may be produced by AND gate 44 between the time that reset inputs to flip-flops 30 through 33 change and a timing pulse is applied to these flip-flops by way of delay circuit 34. Because of the filter in the enabling input of gate 45, these relatively short duration high outputs from AND gate 44 fail to enable gate 45.

Transmitter 43 transmits the carrier waves at frequencies $f_1$ through $f_5$ applied to it.

Although the invention is being described in terms of using single frequency signals to transmit code elements, it should be understood that the invention is not so limited. The invention may be practiced, for example, by using a spectrum of frequencies or a combination of frequencies to represent each code element. Still other means may be employed to represent the code levels.

The operation of the transmitting portion of the embodiment may be summarized as follows:

The output of speech source 10 is sampled and encoded in serial binary form by encoder 11. The output of encoder 11 is translated to a parallel quaternary code (one-out-of-four) form by translator 13. The four distinct levels of the quaternary code (only one of which can be present at any one time) cause disabling input signals to be removed from respective flip-flops 30 through 33. When the disabling input is removed from one of the flip-flops, that flip-flop is toggled by a delayed timing pulse from source 12. The ONE output of flip-flops 30 through 33, when in their high states, cause signals at frequencies $f_1$ through $f_4$ to be applied to transmitter 43. When the ONE outputs are all in their ZERO states, the ZERO outputs are all in their one states and a signal at frequency $f_5$ is applied to transmitter 43. Signals at frequencies $f_1$ through $f_4$ are therefore normally applied to the transmitter in response to the four distinct quaternary code levels, respectively. When, however, a sequence of quaternary outputs at the same code level occur, the signal at frequency $f_5$ is applied to the transmitter during the even numbered occurrences of the code level within the sequence.

Figure 5A:
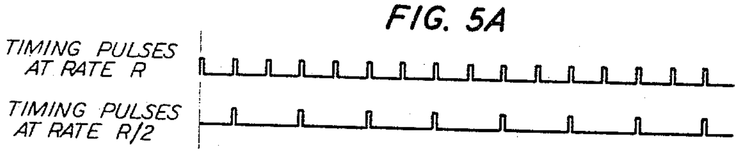
Figure 5B:
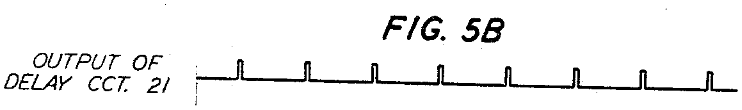

The operation of the transmitting portion of the embodiment may be further appreciated by considering the transmission of a particular combination of binary bits produced as a result of sampling and encoding the output of source 10. FIGS. 5A through 5F show waveforms of potentials at various points within the transmitting portion of the embodiment for the combination of binary bits shown in FIG. 5C. FIGS. 5A through 5F have the common time base shown below FIG. 5F. FIG. 5A shows the timing pulses at repetition rates R and R/2 produced by source 12 while FIG. 5B shows the output of delay circuit 21 which is a delayed version of the pulses at the rate R/2. FIG. 5D shows the parallel outputs of S1 through S4 of translator 13 for the serial binary input shown in FIG. 5C. FIG. 5E shows the outputs of flip-flops 30 through 33 and AND gate 44 while FIG. 5F shows the signals applied to transmitter 43 in response to the quaternary encoder output shown in FIG. 5D.

Figure 5C:
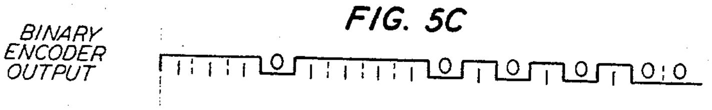
Figure 5D:
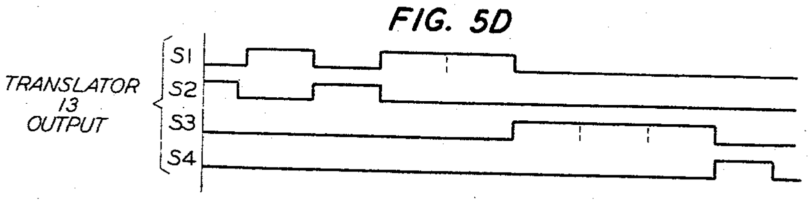
Figure 5E:
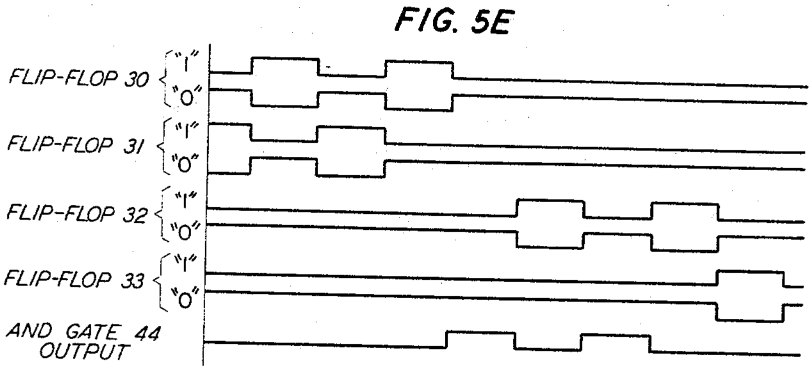
Figure 5F:
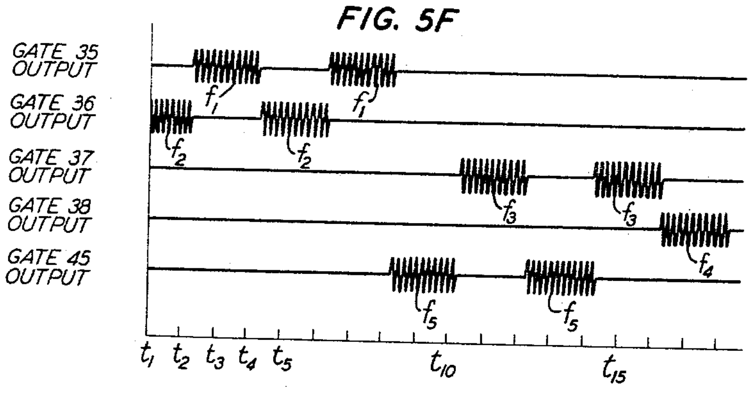

Considering FIGS. 5A through 5F in greater detail, a pair of binary ones occur sequentially between times $t_1$ and $t_3$ in the output of encoder 11 as shown in FIG. 5C. At time $t_2$, which occurs at the beginning of the second of these binary ones, one of the timing pulses at the rate of R/2 is applied to the RESET inputs of flip-flops 22 through 25 and causes flip-flop 23 to be reset. (It is assumed that the binary encoder output prior to that shown in FIG. 5C resulted in placing flip-flop 23 in a set state.) Shortly after time $t_2$, this same timing pulse, which has been delayed in delay circuit 21, is applied to AND gates 17 through 20. It should be noted that the delayed timing pulse is applied to the AND gates shortly after the beginning of the second binary one. At the time the delayed timing pulse is applied to the AND gates, the pair of binary ones, inverter 14 and delay circuits 15 and 16 cause the remaining inputs of AND gate 17 to be high while at least one of the inputs of each of the remaining AND gates is low. AND gate 17 therefore produces a high output which sets flip-flop 22. Flip-flop 22 remains in a set state until the next occurrence of a timing pulse at time $t_4$, at which time it is reset.

It should be noted that, although flip-flop 22 and 23 were reset at times $t_2$ and $t_4$, respectively, their ONE side outputs did not immediately revert to their low states. This characteristic is also present in flip-flops 24 and 25. As will become apparent, such a characteristic is necessary for the correct operation of flip-flops 30 through 33. This hold-over characteristic is produced in a conventional manner by a resistor-capacitor filter present in the output circuit of each of flip-flops 23 through 25.

The high output produced on the ONE side of flip-flop 22 removes the high reset input to flip-flop 30. Shortly after this input is removed, a timing pulse which has been delayed by a slight amount in delay circuit 34 is applied to the toggle input of flip-flop 30. (Delay circuit 34 provides a delay sufficiently long to permit the high input applied to the RESET side of the flip-flop to be removed. The delay must be at least greater than that produced by delay circuit 21 to accomplish this function.) As shown in FIG. 5E, the ONE side of flip-flop 30 switches at this time to a high state while the ZERO side switches to a low state. The ONE sides of the remaining flip-flops 31 through 33 remain in their low states. The high output from the ONE side of flip-flop 30 enables gate 39, so that the transmitter output is at frequency $f_1$. Shortly after flip-flop 22 is reset at time $t_4$ (the delay being produced by the hold-over characteristic of flip-flop 22), the S1 output of translator 13 causes flip-flop 30 to be reset, thus disabling gate 39 and terminating the transmission of energy at frequency $f_1$.

The next pair of binary bits between times $t_3$ and $t_5$ are a binary one and zero. As a result of this pair of binary bits, flip-flops 23 and 31 are caused to change state and enable gate 37 so that the output of transmitter 43 is at frequency $f_2$. The operation of this portion of the circuit is substantially identical to that produced by the previous pair of binary ones.

The next pair of binary bits is another pair of binary ones. The circuit operates as described previously and causes the transmitter output to again be at frequency $f_1$.

The fourth pair of binary bits is still another pair of binary ones. Flip-flop 22 is reset by one of the timing pulses, and then immediately set by the high output produced by AND gate 17 in response to the second sequential pair of binary ones. Because of the hold-over characteristic of flip-flop 22, its ONE side does not revert to a low state during the short interval the flip-flop is in a reset condition. (A broken line is shown in the waveform to indicate that the same quaternary code level has occurred in two sequential quaternary time slots.) As a result of this action, the input to the RESET side of flip-flop 30 remains in a low state.

Because the input to the reset side of flip-flop 30 remains in a low state, the next delayed trigger pulse applied to the toggle input of flip-flop 30 causes the flip-flop to change state so that its ONE side switches to a low state while its ZERO side switches to a high state. Transmission gate 39 is now disabled. At this time the ZERO sides of flip-flops 30 through 33 are all in their high states and AND gate 44 produces a high output which enables transmission gate 45. When transmission gate 45 is enabled, the output of transmitter 43 is at frequency $f_5$ as shown in FIG. 5F.

The next pair of binary bits comprise a binary zero and one. In a manner substantially identical to that described above, flip-flops 24 and 32 change state. When flip-flop 32 changes state, the output of AND gate 44 reverts to its low state, thus terminating the transmission at frequency $f_5$. At the same time, transmission gate 41 is enabled and transmission occurs at frequency $f_3$.

The next pair of binary bits (i.e., between times $t_{11}$ and $t_{13}$) is identical to the previous pair of binary bits. Because this pair is identical to the previous pair, the ONE output of flip-flop 24 remains in its high state and flip-flop 32 is again toggled. Transmission gate 41 is now disabled while the inputs to AND gate 44 are now all in their high states. The output of AND gate 44 again enables transmission gate 45 so that transmission at frequency $f_5$ occurs.

The next pair of binary bits (between times $t_{13}$ and $t_{15}$) is still identical to the previous pair. Because this pair is identical to the previous pair, the ONE output of flip-flop 24 remains in its high state and flip-flop 32 is still again toggled. The ONE output of flip-flop 32 is now in its high state while its ZERO output is in its low state. The output of AND gate 44 reverts to its low state, thus terminating transmission at frequency $f_5$ while transmission gate 41 is enabled so that transmission at frequency $f_3$ occurs again.

The last pair of binary bits shown in FIG. 5C causes flip-flops 25 and 33 to change state, thus enabling transmission gate 42 so that transmission at frequency $f_4$ occurs.

From the above example, it is believed to be readily apparent that the transmitting terminal disclosed in FIG. 1 transmits quaternary encoded information by normally using a unique frequency for each level of the quaternary code. When, however, any of these quaternary levels is immediately repeated one or more times, a frequency different from those normally used is used to represent the even numbered occurrences of this code level. This different frequency performs a ditto-like function in that it indicates that the immediately previous quaternary level has been repeated.

The signals transmitted by the transmitting station of FIG. 1 are received and amplified by a receiver 47 in the receiving terminal disclosed in FIG. 2. The output of receiver 47, which output is at frequencies $f_1$ through $f_5$, is applied to a plurality of bandpass filters 48 through 52. Bandpass filters 48 through 52 pass signals at frequencies $f_1$ through $f_5$, respectively. The outputs of the bandpass filters are detected in detectors 53 through 57, respectively, and then passed through low pass filters 58 through 62, respectively. The low pass filters eliminate some of the noise signals in the outputs of detectors 53 through 57.

A portion of the outputs of low pass filters 58 through 62 are integrated in integrators 63 through 67, respectively. These integrators are provided with enabling inputs which will be discussed in greater detail subsequently. When enabled, the integrators integrate a portion of the outputs of their respective low pass filters. One of the outputs of the low pass filters has present a signal indicative of the frequency of the signal received by receiver 47. These outputs also include some noise signals. The integrators, when enabled, integrate both the signal indicative of the frequency of the output of receiver 47 and the noise signals. The output of the integrator to which the signal representative of the frequency of the output of receiver 47 is applied of course increases at a more rapid rate than the outputs of the remaining integrators. As discussed subsequently, this feature is used to advantage.

The outputs of low pass filters 58 through 62 are also applied to a timing recovery circuit 68. Timing recovery circuit 68 is responsive to the occurrences of the outputs of the low pass filters representative of the frequencies of the output of receiver 47 to produce both output pulses and square waves at the rate $R/2$.

The outputs of integrators 63 through 67 are applied to a plurality of AND gates 69 through 73. The outputs of AND gates 69 through 73, in turn, are applied to the SET inputs of a plurality of flip-flops 74 through 78. The ZERO side output of each flip-flop 74 through 78 is fed back to each of AND gates 69 through 73 associated with the remaining flip-flops.

Delayed timing pulses from a delay circuit 79 are applied to the RESET inputs of flip-flops 74 through 78. In operation the ZERO sides of flip-flops 74 through 78 are, of course, in their high states following the occurrence of a timing pulse from circuit 79. Four out of five of the inputs to each of AND gates 69 through 73 are therefore in high states. The output of the one of integrators 63 through 67 which first reaches a threshold level causes the AND gate to which that output is applied to produce a high output.

A high output from one of AND gates 69 through 73 causes one of flip-flops 74 through 78 to change state. Upon changing state, the ZERO side of the flip-flop switches to its low state, thus prohibiting the AND gates connected to the remaining flip-flops from producing high outputs. AND gates 69 through 73 and flip-flops 74 through 78, therefore, function to detect the first integrator output to reach a threshold level. This is indicated by the ONE side of the flip-flop associated with the integrator reaching the threshold level being in a high state.

A plurality of AND gates 80 through 89, a plurality of flip-flops 90 through 94, and a delay circuit 95 are provided to retime and reshape the outputs of flip-flops 74 through 78. In particular, AND gates 80 through 89 are connected between the outputs of flip-flops 74 through 78 and the inputs of flip-flops 90 through 94, respectively. Delayed timing pulses from a delay circuit 95 are applied to each of AND gates 80 through 89. The occurrence of a timing pulse therefore causes flip-flops 90 through 94 to assume the same states as flip-flops 74 through 78.

The delay provided by delay circuit 95 is slightly less than that provided by delay circuit 79. As a result of this slight difference in delay, flip-flops 74 through 78 are all placed in a reset condition shortly after their previous conditions have been transferred to flip-flops 90 through 94. Because the transfer between flip-flops 74 through 78 and 90 through 94 occur at the rate of the timing pulses produced by timing recovery circuit 68, the outputs of 90 through 94 are uniform in duration.

It is believed apparent from the above discussion that the receiving terminal includes five signal channels, each of which is responsive to a distinct one of the frequencies $f_1$ through $f_5$. For purposes of the following discussion these channels are referred to as channels $f_1$ through $f_5$.

As discussed previously one feature of the present invention is that the receiving terminal may be blocked, during each quaternary time slot, to the frequency of the signal previously detected. This is permissible because none of the frequencies can succeed itself. The advantage of this feature is that the possibility of errors produced by noise in the channel of the previously received signal may be eliminated. This feature is accomplished in the present embodiment by applying the ZERO side outputs of flip-flops 90 through 94 to a plurality of AND gates 96 through 100. The pulse output of timing recovery circuit 68 is also applied to these AND gates. When enabled, the integrators are enabled for a relatively short interval compared to a quaternary time slot. The integrators in effect sample the outputs of the low pass filters when the anticipated signal in these outputs is at approximately its maximum level.

In the absence of a signal in one of the channels, the channel output flip-flop is in a reset condition so that its ZERO side is high. The next timing pulse from circuit 68 causes the AND gate connected to the ZERO side of that output flip-flop to produce a high output which enables the channel integrator. When, however, a signal is detected by one of the channels, the ZERO side of the channel output flip-flop switches to a low state. The AND gate to which this low state is applied cannot, therefore, produce a high output upon the next occurrence of a trigger pulse. The integrator in that channel is therefore not enabled during the subsequent quaternary time slot, thus substantially eliminating the possibility of the channel producing a false output. The channel output flip-flop is reset upon the next occurrence of a timing pulse from delay circuit 95, thus permitting the integrator in the channel to be enabled upon the occurrence of the next timing pulse from timing recovery circuit 68.

The ONE side outputs of flip-flops 90 through 92 are applied to three OR gates 101 through 103, respectively. The outputs of the OR gates are applied to a parallel quaternary to serial binary translator 104. The outputs of the OR gates are also delayed for one quaternary time slot by delay circuits 105 through 107 and then applied to AND gates 108 through 110, respectively. The ONE side output of the flip-flop 94 is also applied to AND gates 108 through 110.

When the ONE side of flip-flop 94 switches to a high state following the occurrence in the previous quaternary time slot of a high state in the output of one of OR gates 101 through 103, the high state output is repeated in that OR gate output for the following time slot. The ditto-like nature of frequency $f_5$ is therefore utilized by causing the high state outputs of OR gates 101 through 103 to be reproduced when the frequency $f_5$ is detected in the received signals. The outputs of OR gates 101 through 103 therefore correspond to the S1 through S3 outputs of translator 13 at the transmitting terminal. These outputs are therefore identified as S1 through S3.

It will be noted that an input S4 is not applied to translator 104. It is unnecessary to apply such an input to translator 104 because the absence of a high state in inputs S1 through S3 implies that S4 is present. This will become more apparent in the following discussion of a particular decoder that may be used for translator 104.

Although channel $f_4$ is not utilized to produce an output S4 for applying to translator 104, this channel operates both to help recover the timing pulses and to disable AND gates 69, 70, 71, 73 and 99 when frequency $f_4$ is detected so that the possibility of false outputs is reduced.

FIG. 4 discloses a translator that may be used as translator 104 in FIG. 2. In particular, the output S1 from OR gate 101 is applied to an OR gate while outputs S2 and S3 from OR gates 102 and 103 are applied to AND gates 112 and 113, respectively. The square wave timing signals from timing recovery circuit 68 are applied directly to AND gate 112 and, after being inverted by an inverter 114, to AND gate 113. The outputs of AND gates 112 and 113 are applied to OR gate 111.

When S1 is in a high state, the output of OR gate 111 is also in a high state. Since a quaternary time slot corresponds to two binary time slots, the output of OR gate under these conditions corresponds to a pair of sequential binary ones.

Upon the occurrence of a high state in S2, the output of AND gate 112 is high for the first half of a quaternary time slot and low for the remainder. This occurs because the timing waveform is high for only the first half of the quaternary time slot. The output of OR gate 111 under these conditions corresponds to a binary one and a binary zero occurring in that sequence.

When S3 is in a high state, the output of AND gate 113 is in a low state for the first half of a quaternary time slot. This is because the timing waveform applied to gate 113 is in a low state as a result of the action of inverter 114. During the second half of the timing waveform, the output of gate 113 is in a high state because the output of inverter 114 is now high. The output of OR gate 111 therefore appears as a binary zero and a binary one occurring in that sequence.

The absence of a high state in S1, S2 and S3 of course results in a low state output from OR gate 111. Under these conditions, the low state corresponds to one or more pairs of binary zeros.

Referring again to FIG. 2, the output of translator 104 is decoded in serial binary decoder 115 to produce a speech output. This speech output is substantially identical to the speech output from source 10 in FIG. 1.

The operation of the receiving terminal may be briefly summarized as follows:

Signals are received and amplified by receiver 47 and applied to five channels. The channels are responsive to signals at frequencies $f_1$ through $f_5$. As soon as a channel detects a signal, it disables the remaining channels by disabling the AND gate 69 through 73 located in each of the other channels. Furthermore, once a channel has detected a signal, it disables itself for the following quaternary time slot by feeding back a signal to the AND gate of AND gates 96 through 100 located in that channel. When the channels responsive to frequencies $f_1$ through $f_3$ detect a signal, an output signal is both applied to translator 104 and, in effect, stored for one quaternary time slot. When the channel responsive to frequency $f_5$ detects a signal immediately following the detection of a signal in one of channels $f_1$ through $f_3$, the stored output is applied to translator 104. By this means, the high states of outputs S1, S2 and S3 of translator 13 (of FIG. 1)

are reproduced and applied to translator 104. The high state of output S4 of translator 13 is not applied to translator 104 as the absence of high states in outputs S1, S2 and S3 as applied to translator 104 implies that the high state of S4 is present. Translator 104 translates the parallel quaternary to serial binary while decoder 115 decodes the serial binary to speech.

Although only one embodiment of the invention has been described in detail, it is to be understood that various other embodiments may be devised by those skilled in the art without departing from the spirit and scope of the invention.

What is claimed is:

1. A pulse transmission system for conveying signals uniquely representative of distinctive code levels in an encoded message, said system comprising means responsive to said signals to transmit a pulse of energy at a first frequency only for each even numbered signal in each sequence where any one of said signals is repeated more than once and pulses of energy at other frequencies uniquely related to the types of said signals for all the remainder of said signals, respectively, a receiver for receiving said transmitted pulses, and means for producing signals uniquely representative of the received pulses at said other frequencies and for causing the previously produced signal to be repeated upon each reception of a pulse at said first frequency.

2. A pulse transmission system for conveying successive bits of information in the form of pulses of energy, said system comprising means responsive to said bits to produce a first control signal only for each even numbered bit in each sequence where any one of said bits is repeated, more than once and other control signals uniquely related to the types of said bits for all of the remaining bits, means for generating signals at a plurality of different frequencies equal in number to the types of said control signals, means responsive to said control signals for keying said generating means to transmit pulses of energy at frequencies unique to said types of control signals, a receiver for receiving said pulses, and means for producing signals uniquely representative of the received pulses corresponding to said other control signals and for causing the previously produced signal to be repeated upon each reception of a pulse at said first frequency.

3. A pulse transmission system in accordance with claim 2 in which the last-mentioned means comprises frequency selective means comprising a plurality of channels equal in number to the number of frequencies produced by said generating means for separating said received pulses of energy on a frequency basis and producing outputs in response thereto, and means for applying said channel outputs corresponding to at least one of said other control signals to a utilization circuit and for immediately reapplying the previously applied channel output to said utilization circuit upon the occurrence of the channel output corresponding to said first control signal.

4. A pulse transmission system in accordance with claim 3 in which each of said channels comprises a frequency sensitive detector responsive to signals at one of said frequencies, means for integrating the output of said frequency sensitive detector, means responsive to a predetermined output level of said integrator to produce a substantially uniform channel output and to render the remaining channels insensitive to their integrator outputs until reset by a timing pulse, and means responsive to said channel output to disable said integrator for a predetermined interval.

5. A pulse transmission system comprising a source of signals representative of code levels where any one of said signals may be repeated more than once in succession because the code level it represents is repeated more than once in succession, means connected to said source and responsive to said signals to transmit pulses of energy having frequencies which are uniquely related to the distinctive signals present in said signals, said means being rendered incapable of transmitting a pulse of energy at the same frequency as the previously transmitted pulse of energy for one pulse period following the termination of the previous transmission, means connected to said first-mentioned means for transmitting a pulse of energy at a frequency other than said uniquely related frequencies only when said first-mentioned means is not causing a pulse of energy to be transmitted, a receiver to receive said transmitted pulses of energy, and means responsive to said received pulses to produce signals uniquely related to said received pulses corresponding to the signals causing said first-mentioned means to transmit pulses of energy and to reproduce the signal immediately previously produced in response to the reception of a pulse of energy at the frequency other than said uniquely related frequencies.

6. Apparatus in accordance with claim 5 in which the last-mentioned means comprises a plurality of channels equal in number to the number of frequencies of the pulses transmitted for separating said received pulses of energy on a frequency basis and producing outputs in response thereto, and means for applying said channel outputs corresponding to at least one of said first-mentioned means transmitted pulses to a utilization circuit and for immediately reapplying the previously applied channel output to said utilization circuit upon the occurrence of the channel output corresponding to the pulses of energy at the frequency other than said uniquely related frequencies.

7. A pulse transmission system in accordance with claim 6 in which each of said channels comprises a frequency selective detector responsive to signals at one of said frequencies, means for integrating the output of said frequency sensitive detector, means responsive to a predetermined level of said integrator to produce a substantially uniform channel output and to render the remaining channels insensitive to their integrator outputs until reset by a timing pulse, and means responsive to said channel output to disable said integrator for a predetermined interval.

8. A pulse transmission system comprising a source of signals representative of code levels where any one of said signals may be repeated more than once in succession because the code level it represents is repeated more than once in succession, a plurality of means connected to said source and corresponding in number to the distinctive signals present in said signals, said means responsive to said distinctive signals, respectively, to produce a first output in response in the absence of its distinctive signal, a second output for at least a predetermined interval in response to the occurrence of its distinctive signal and said first output for at least a predetermined interval following the occurrence of its second output, means connected to said plurality of means to produce a third output in response to the simultaneous occurrences of said first outputs, means responsive to said second and third outputs to transmit pulses of energy, respectively, having frequencies which are uniquely related to said second and third outputs, a receiver to receive said transmitted pulses of energy, and means responsive to said received pluses to produce signals uniquely related to said received pulses corresponding to said second outputs and to reproduce for each of said received pulses corresponding to said third outputs the signal immediately previously produced.

9. Apparatus in accordance with claim 8 in which the last-mentioned means comprises a plurality of channels equal in number to the number of frequencies of the pulses transmitted for separating said received pulses of energy on a frequency basis and producing outputs in response thereto, and means for applying said channel outputs corresponding to at least one of said first-mentioned means transmitted pulses to a utilization circuit and for immediately reapplying the previously applied channel output to said utilization circuit upon the occurrence of the channel output corresponding to the pulses of energy at the frequency other than said uniquely related frequencies.

10. A pulse transmission system in accordance with claim 9 in which each of said channels comprises a frequency selective detector responsive to signals at one of said frequencies, means for integrating the output of said frequency sensitive detector, means responsive to a predetermined level of said integrator to produce a substantially uniform channel output and to render the remaining channels insensitive to their integrator outputs until reset by a timing pulse, and means responsive to said channel output to disable said integrator for a predetermined interval.

References Cited

UNITED STATES PATENTS

| | | | |
|---|---|---|---|
| 2,705,795 | 4/1955 | Fisk et al. | 325—40 |
| 2,974,196 | 3/1961 | Van Duuren | 178—66 X |
| 3,226,644 | 12/1965 | Goode et al. | 325—42 X |

JOHN W. CALDWELL, *Acting Primary Examiner.*

W. S. FROMMER, *Assistant Examiner.*